US008343412B2

(12) United States Patent
Klein et al.

(10) Patent No.: US 8,343,412 B2
(45) Date of Patent: Jan. 1, 2013

(54) SEALING OF INSCRIPTIONS ON PLASTICS

(75) Inventors: Sylke Klein, Roβdorf (DE); Tanja Lueckert (formerly Sandner), Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 13/013,576

(22) Filed: Jan. 25, 2011

(65) Prior Publication Data

US 2011/0117335 A1 May 19, 2011

Related U.S. Application Data

(63) Continuation of application No. 11/547,014, filed on Oct. 2, 2006, now abandoned.

(30) Foreign Application Priority Data

Mar. 30, 2004 (DE) ......................... 10 2004 016 037
May 26, 2004 (DE) ......................... 10 2004 026 335

(51) Int. Cl.
*B29C 35/08* (2006.01)

(52) U.S. Cl. ......... 264/482; 264/400; 427/555; 430/200

(58) Field of Classification Search ............... 219/121.6, 219/121.65, 121.66, 121.68, 121.69, 121.85; 427/555; 430/200; 264/482
See application file for complete search history.

(56) References Cited

U.S. PATENT DOCUMENTS

| | | | |
|---|---|---|---|
| 4,654,290 A | 3/1987 | Spanjer | |
| 4,961,077 A | 10/1990 | Wilson et al. | |
| 5,215,864 A | 6/1993 | Laakmann | |
| 5,829,353 A * | 11/1998 | Ellis | 101/460 |
| 6,127,199 A | 10/2000 | Inoue et al. | |
| 6,238,847 B1 | 5/2001 | Axtell et al. | |
| 6,703,119 B2 | 3/2004 | Peiffer et al. | |
| 6,924,077 B2 | 8/2005 | Delp et al. | |
| 7,009,633 B2 | 3/2006 | Steenackers | |
| 7,629,400 B2 * | 12/2009 | Hyman | 524/106 |
| 7,744,804 B2 | 6/2010 | Nakagawa et al. | |
| 2005/0035590 A1 | 2/2005 | Jones et al. | |

FOREIGN PATENT DOCUMENTS

| | | | |
|---|---|---|---|
| DE | 40 01 856 | A1 | 8/1990 |
| DE | 199 42 316 | A1 | 3/2001 |
| EP | 0 201 627 | A | 11/1986 |
| EP | 0 605 803 | A | 7/1994 |
| EP | 1 279 517 | A | 1/2003 |
| WO | WO 98/28365 | A | 7/1998 |
| WO | WO 2005/047010 | A | 5/2005 |

* cited by examiner

*Primary Examiner* — Samuel M Heinrich
(74) *Attorney, Agent, or Firm* — Millen, White, Zelano & Branigan, P.C.

(57) ABSTRACT

The present invention relates to the sealing of inscriptions on plastics which have been produced by means of lasers on the plastic surface.

14 Claims, 6 Drawing Sheets

Layer system for 1-step process

Layer system for 1-step process

Layer systems for 2-step process

1st step: inscription

2nd step: sealing

SEALING OF INSCRIPTIONS ON PLASTICS

This application is a continuation of application Ser. No. 11/547,014, filed Oct. 2, 2006 now abandoned, which is incorporated by reference herein.

The present invention relates to the sealing of inscriptions on plastics which have been produced by means of lasers on the plastic surface, preferably indirectly.

With the aid of laser beams of various wavelengths, it is possible permanently to mark and inscribe materials and production goods.

The term "inscription" below is intended to mean any type of labelling by the laser, i.e. inscription, marking, coding, etc.

"Coloured laser inscription" is taken to mean the inscription of plastics using all coloured and non-coloured pigments or dyes (all colours including black, white and all grey shades).

The marking and/or inscription is carried out through the action of laser energy 1. on the material itself (direct inscription) or 2. on an inscription medium which is transferred from the outside to the material to be inscribed (indirect inscription).

Thus, in inscription method 1), metals, for example, react to laser irradiation with various tempering colours, woods become dark (carbonisation) in the irradiated areas and plastics, such as, for example, PVC, exhibit pale or dark discolorations (foaming, carbonisation) depending on the plastic colouring.

In plastics, these effects are frequently augmented or initiated by the addition of laser-sensitive pigments. The disadvantages generally consist in that only the "colours" white and black or various grey and bleached shades can be achieved, and that the laser-sensitive pigments have to be added to the entire plastic material in the masterbatch.

In inscription method 2), if a laser beam of suitable energy and wavelength (for example IR laser) hits an inscription medium and if this is in contact with the material to be inscribed, the inscription medium is transferred to the material and fixed thereto. Materials can be inscribed indirectly with suitable coloured and non-coloured pigment or dye mixtures, suspensions, pastes or laser films or tapes. In this way, coloured and black/white inscription of high contrast is possible. The amount of laser-sensitive pigment actually required for the inscription is significantly smaller here than, for example, in the case of the masterbatch addition (inscription method 1) or is not required in certain applications.

Inscription media comprising glass frits or glass frit precursors with laser energy absorbers, to which—depending on the desired colour—inorganic and organic pigments, metal oxides, organometallic substances or metal powders are added, are generally known to the person skilled in the art. Processes of this type are described, for example, in WO 99/16625, U.S. Pat. No. 6,238,847, U.S. Pat. No. 6,313,436 and WO 99/25562.

After application of the pigment and/or dye mixtures directly to the medium to be inscribed, for example by spraying, brushing, scattering, electrostatic charging, etc., or to support substrates, such as tapes, films or the like, irradiation and inscription with the requisite laser energy (1-30 W output power in cw mode) or laser energy density (100 W/cm$^2$-3 GW/cm$^2$ in pulsed mode) are carried out. In this way, it is possible to inscribe glass, ceramic, metal, stone, plastics and composites. Inscription methods of this type are disclosed, for example, in WO 03/035411, WO 03/080334 and WO 03/080335.

EP 1279517 A1 and DE 19942316 A1 describe laser-sensitive mixtures of glass pigments and plastic granules especially for the coloured laser marking and inscription of plastics.

An essential disadvantage in the indirect laser inscription of plastics produced in these processes is the very high local pigment or dye concentration in the inscription areas, which frequently results in smeared, unsharp inscriptions, which may also effloresce or bleed out later. This applies, in particular, in the case of the use of organic pigments or dyes.

Whereas maximum pigment concentrations of $\geqq$0.5% for organic pigments and $\geqq$2% for inorganic pigments are used in the conventional colouring of plastics, the pigment concentrations in the plastic areas laser-inscribed, for example, in accordance with WO 99/16625 are well above 20%.

This overpigmentation results—depending on the inscribed plastic and the later service temperature—in migration of the pigments or dyes to the plastic surface, so-called efflorescence.

If the inscriptions are brought into contact with other materials and if transfer of the excess pigments or dyes into these materials takes place in the process, the term bleeding-out is used.

This overpigmentation makes additional subsequent cleaning and drying steps necessary, which is technologically undesired or unacceptable, in particular for an in-line production process with product inscription as the final process step.

Furthermore, the inscription bleeds out or effloresces or fades during use, for example due to environmental influences, etc.

For certain applications, such as inscriptions of food commodities, medicament packaging, toys, medical products, etc., inscriptions which bleed out or effloresce in this way cannot be used at all.

The object of the present invention is therefore to achieve a non-efflorescent, non-bleeding laser inscription of plastics with high edge sharpness and high resistance to environmental influences, where the laser inscription is produced on the plastic surface, preferably indirectly.

Surprisingly, it has been found that efflorescence or bleeding-out of the plastics inscribed in colour using a laser is suppressed by sealing the inscribed areas during the inscription operation. The sealing is carried out with the aid of transparent layers of polymers, which preferably have glass transition temperatures of $\geqq$90° C., in particular between 100 and 120° C. This polymer layer can be applied as a separate layer or surround and thus seal the colorants.

The invention relates to a process for the permanent and abrasion-resistant coloured inscription of plastics, characterised in that the bleeding-out or efflorescence of the colorants and/or absorbers (laser-sensitive pigments) in the inscribed areas in the plastic is prevented by sealing the laser-inscribed areas with a transparent polymer during the inscription process itself or immediately thereafter.

Compared with the prior art, the process according to the invention is distinguished by the following features:

- smearing and/or later bleeding-out/efflorescence of the pigments or dyes is prevented
- undesired cleaning steps after the actual inscription process are unnecessary
- the colour fastness of the inscription during later use is guaranteed.

The polymer layer for the sealing can be applied to the inscription which has taken place in the 1st step in a 1-step process together with the laser inscription or in a 2-step process. Layer systems as shown in FIGS. 1-12 have proven particularly suitable.

The inscription of the plastic using a laser is preferably carried out by indirect inscription, for example as described in WO 99/16625 or in unpublished DE 10352857. The plastics are inscribed in colour by introducing the inscription medium into the plastic substrate by means of laser energy. The inscription medium is detached from the support film and then bonds durably to the likewise warmed and thus locally softened plastic surface.

1-STEP PROCESS

Figure 1:
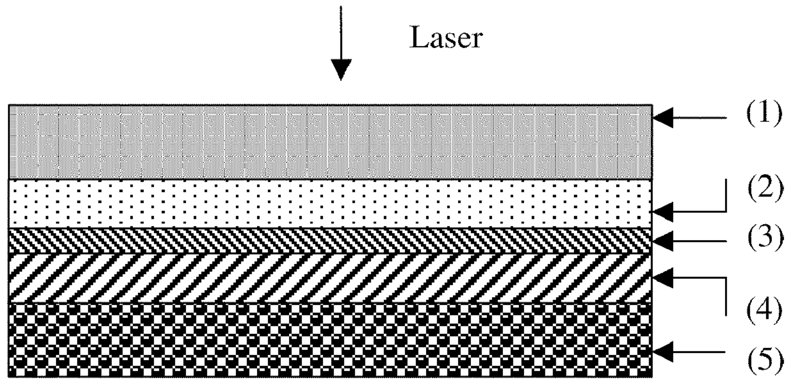
FIG. 1 shows diagrammatically the 1-step process in the process according to the invention.

FIGS. 1-6 show diagrammatically the 1-step process in the process according to the invention. In FIG. 1, the layer system consists of a resistant support layer (1) which is transparent to laser light, a laser-sensitive energy absorber layer (2), a separation layer (3), a separate sealing layer (4) and finally an inscription medium (5), the latter comprising pigments and/or dyes. The inscription medium side of this layer system is brought into close contact with the plastic to be inscribed.

Figure 2:
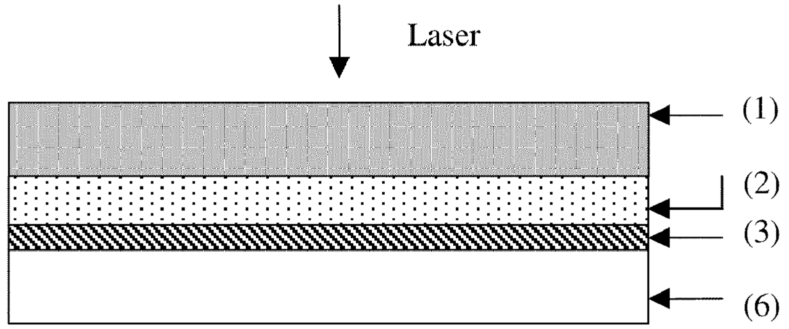
FIG. 2 shows diagrammatically the 1-step process in the process according to the invention.
Figure 4:
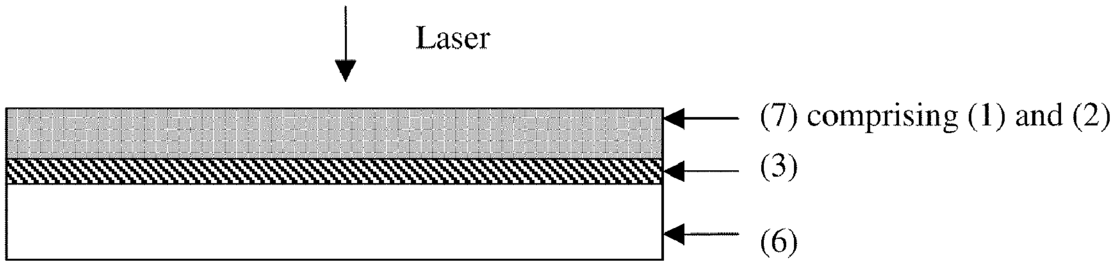
FIG. 4 shows diagrammatically the 1-step process in the process according to the invention.
Figure 6:
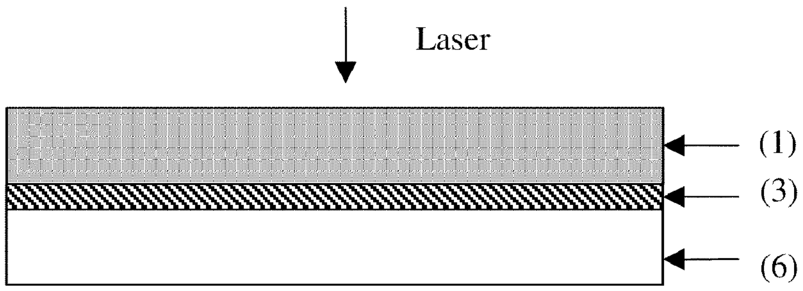
FIG. 6 shows diagrammatically the 1-step process in the process according to the invention.
Figure 7:
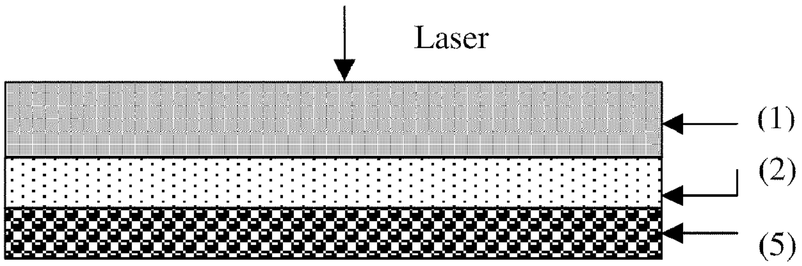
FIG. 7 shows diagrammatically the first step in a 2-step process in the process according to the invention.
Figure 8:
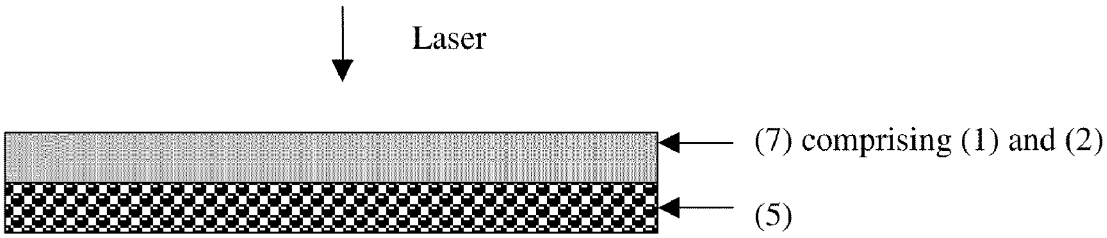
FIG. 8 shows diagrammatically the first step in a 2-step process in the process according to the invention.

Alternatively, the colorant itself can be coated with a sealing polymer layer or embedded in a polymer matrix (6) (FIGS. 2, 4, 6).

Figure 3:
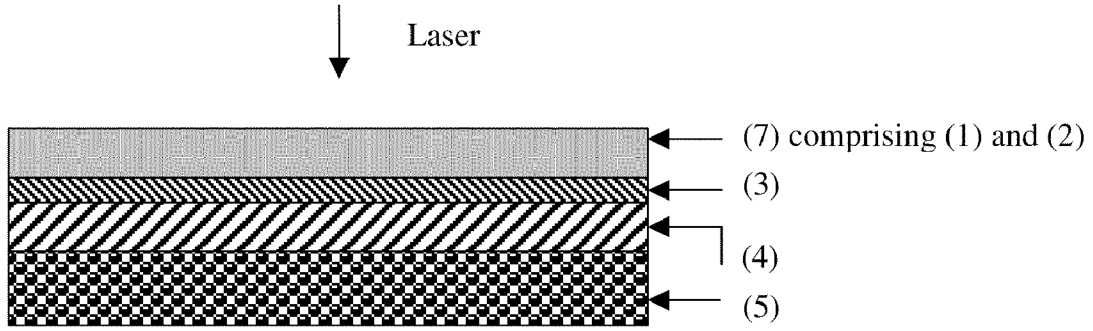
FIG. 3 shows diagrammatically the 1-step process in the process according to the invention.

It is likewise possible to incorporate the energy absorber into the support layer (layer 7 in FIGS. 3, 4).

In this 1-step process, the inscription of a plastic with sealing is produced using a suitable laser. The energy necessary for this purpose is transferred via the energy absorber layer (2, 7) to the separation layer (3), which softens and thus transfers the sealing layer (4) and the inscription medium (5) or the sealed colorant (6) to the plastic. The laser energy must be selected here in such a way that the plastic likewise softens in the inscription areas and forms a strong bond to the sealing layer (4) or the sealed colorant (6).

Figure 5:
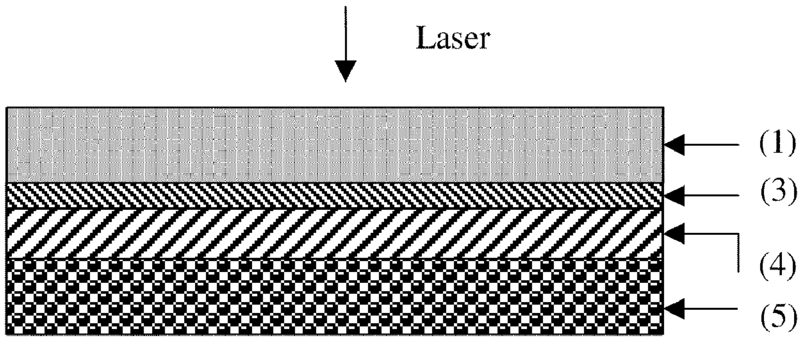
FIG. 5 shows diagrammatically the 1-step process in the process according to the invention.

In certain applications, such as in self-absorbent plastics (for example dark-coloured plastics, good affinity of the plastic to the sealing polymer), inscription is successful even without additional absorber (FIGS. 5, 6).

2-STEP PROCESS

In the 2-step process, the inscription operation is separated from the subsequent sealing. In the 1st step, the inscription is produced. This can take place by means of layer structures as shown in FIGS. 7 to 10.

Figure 9:
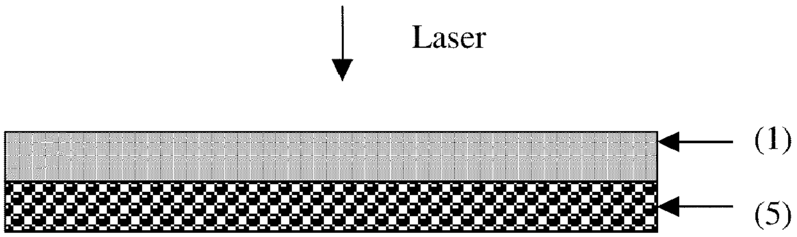
FIG. 9 shows diagrammatically the first step in a 2-step process in the process according to the invention.
Figure 10:
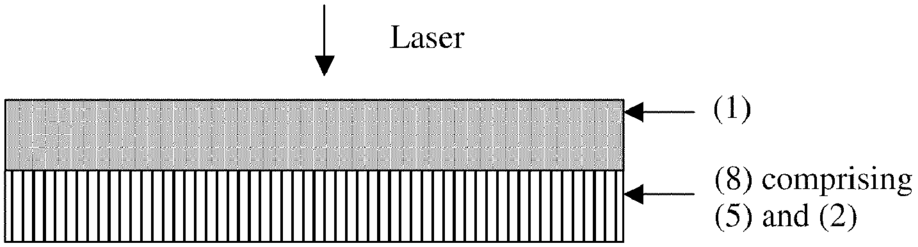
FIG. 10 shows diagrammatically the first step in a 2-step process in the process according to the invention.

The energy absorber is applied as a separate layer (2) to a stable support film (1) which is transparent to laser light (FIG. 7) or incorporated into the support film (7) (FIG. 8) or is unnecessary in the case of self-absorbent plastics (FIG. 9), the inscription medium (5) is applied as a separate layer (FIGS. 7-9) or as a layer (8) consisting of a mixture of inscription medium (5) and energy absorber (2) (FIG. 10).

By means of a suitable laser, the requisite energy is transferred via the energy absorber layer (2, 7) to the inscription medium (5) and to the plastic or transferred directly via layer (8) to the plastic. The inscription medium (5) is transferred to the softened plastic and results in an inscription of the plastic.

Figure 11:
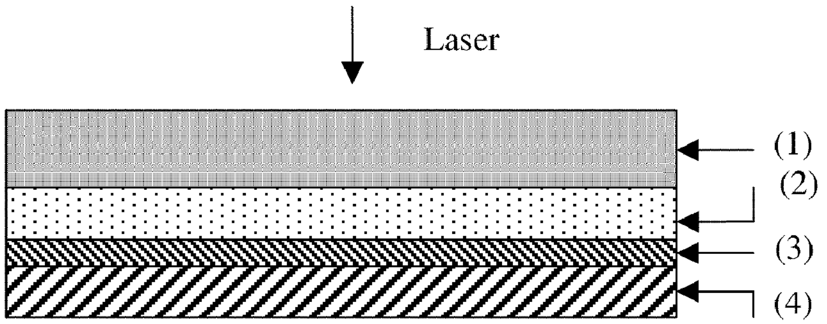
FIG. 11 shows diagrammatically the second step in a 2-step process in the process according to the invention.
Figure 12:
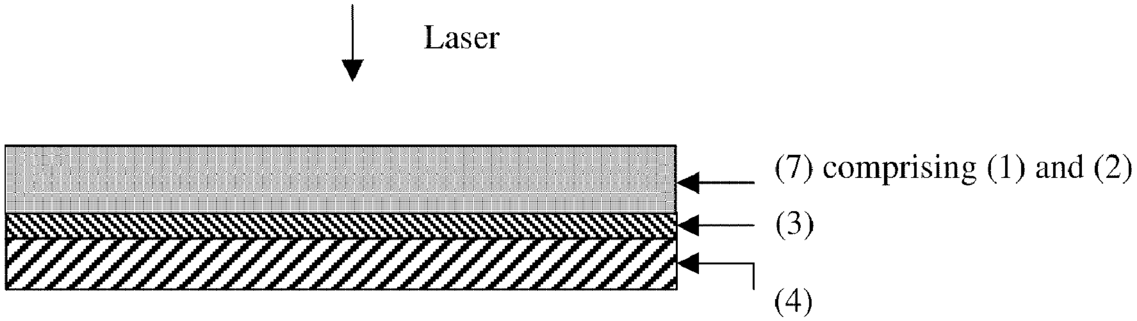
FIG. 12 shows diagrammatically the second step in a 2-step process in the process according to the invention.
Figure 13:
FIG. 13 shows the results of a marking experiment.
Figure 14:
FIG. 14 shows the results of a marking experiment.
Figure 15:
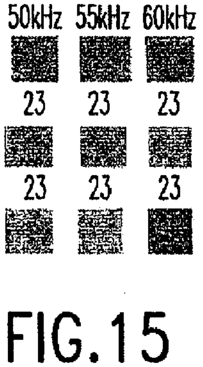
FIG. 15 shows the results of a marking experiment.
Figure 16:
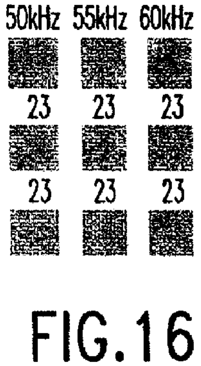
FIG. 16 shows the results of a marking experiment.
Figure 17:
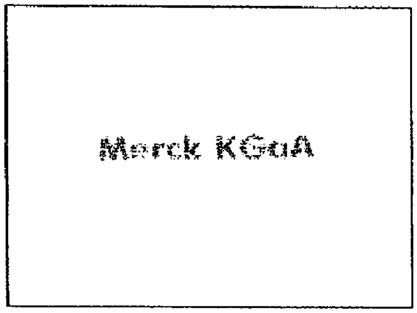
FIG. 17 shows the results of a marking experiment.
Figure 18:
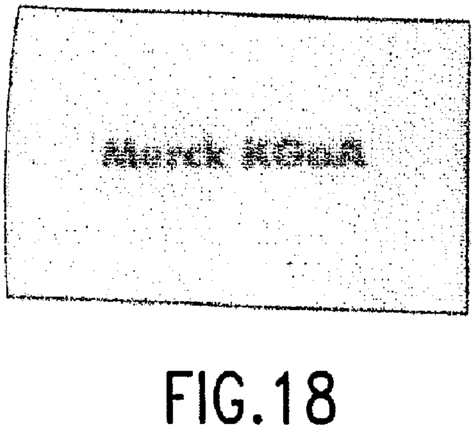
FIG. 18 shows the results of a marking experiment.
Figure 19:
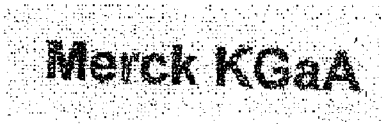
FIG. 19 shows the results of a marking experiment.
Figure 20:
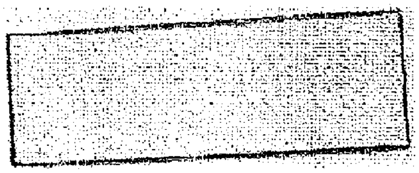
FIG. 20 shows the results of a marking experiment.

In the 2nd step, the sealing is produced by means of a layer structure (FIGS. 11, 12) consisting of a resistant support layer (1) which is transparent to laser light, a laser-sensitive energy absorber layer (2 or incorporated into 7), a separation layer (3) and a sealing layer (4).

By means of a suitable laser, the requisite energy is transferred via the energy absorber layer (2, 7) to the separation layer (3), which softens and thus transfers the sealing layer (4) to the plastic. The laser energy must be selected in such a way that the plastic re-softens in the inscription areas and forms a strong bond to the sealing layer.

Suitable materials for the support layer (1) are all materials which are ideally transparent and/or translucent to the laser light in the stated wavelength range and are not damaged or destroyed by the interaction with the laser light.

Suitable materials are for example, glass and plastics, which are ideally employed in the form of films, tapes or sheets and preferably have layer thicknesses of 5-250 μm, in particular 10-150 μm and very particularly preferably 15-75 μm.

Suitable plastics are preferably thermoplastics. In particular, the plastics consist of polyesters, polycarbonates, polyimides, polyacetals, polyethylene, polypropylene, polyamides, polyester-esters, polyether-esters, polyphenylene ether, polybutylene terephthalate, polyethylene terephthalate, polymethyl methacrylate, polyvinyl acetal, polyvinyl chloride, polystyrene, acrylonitrile-butadiene-styrene (ABS), acrylonitrile-styrene-acrylate (ASA), polyether sulfones and polyether ketones, and copolymers and/or mixtures thereof.

Of the said plastics, particular preference is given to polyesters, polyethylene terephthalate, polyethylene, polypropylene, polycarbonates and polyimides.

Especially for the inscription and marking of three-dimensional plastic parts or surfaces, unstretched amorphous plastic support films made from polyethylene terephthalate, polyester and polyamide are suitable.

Energy absorbers which can be used are all materials which absorb the laser light energy to an adequate extent in the stated wavelength range and convert it into thermal energy.

Suitable energy absorbers for the marking are preferably based on carbon, carbon black, anthracene, IR-absorbent colorants, such as, for example, perylenes/rylenes, pentaerythritol, phosphates, such as, for example, copper hydroxide phosphates, sulfides, such as, for example, molybdenum disulfide, oxides, such as, for example, antimony(III) oxide, $Fe_2O_3$ and $TiO_2$, bismuth oxychloride, flake-form, in particular transparent or semi-transparent substrates comprising, for example, phyllosilicates, such as, for example, synthetic or natural mica, talc, kaolin, glass flakes, $SiO_2$ flakes or synthetic support-free flakes. Also suitable are flake-form metal oxides, such as, for example, flake-form iron oxide, aluminium oxide, titanium dioxide, silicon dioxide, LCPs (liquid crystal polymers), holographic pigments, conductive pigments or coated graphite flakes.

Flake-form pigments which can be employed are also metal powders, which may be uncoated or also covered with one or more metal-oxide layers; preference is given, for example, to Al, Cu, Cr, Fe, Au, Ag and steel flakes. If corrosion-susceptible metal flakes, such as, for example, Al, Fe or steel flakes, are to be employed in uncoated form, they are preferably coated with a protective polymer layer.

Besides flake-form substrates, it is also possible to employ spherical pigments, for example comprising Al, Cu, Cr, Fe, Au, Ag and/or Fe.

Particularly preferred substrates are mica flakes coated with one or more metal oxides. The metal oxides used here are both colourless, high-refractive-index metal oxides, such as, in particular, titanium dioxide, antimony(III) oxide, zinc oxide, tin oxide and/or zirconium dioxide, and coloured metal oxides, such as, for example, chromium oxide, nickel oxide, copper oxide, cobalt oxide and in particular iron oxide ($Fe_2O_3$, $Fe_3O_4$). The energy absorber used is particularly preferably antimony(III) oxide, alone or in combination with tin oxide.

These substrates are known and in the majority of cases are commercially available, for example under the trade name Iriodin® Lazerflair from Merck KGaA, and/or can be prepared by standard processes known to the person skilled in the art.

Pigments based on transparent or semitransparent flake-form substrates are described, for example, in the German Patents and Patent Applications 14 67 468, 19 59 998, 20 09 566, 22 14 454, 22 15 191, 22 44 298, 23 13 331, 25 22 572, 31 37 808, 31 37 809, 31 51 343, 31 51 354, 31 51 355, 32 11 602, 32 35 017, 38 42 330 and 44 41 223.

Coated $SiO_2$ flakes are disclosed, for example, in WO 93/08237 (wet-chemical coating) and DE-A 196 14 637 (CVD process).

Multilayered pigments based on phyllosilicates are disclosed, for example, in DE-A 196 18 569, DE-A 196 38 708, DE-A 197 07 806 and DE-A 198 03 550. Particularly suitable are multilayered pigments which have the following structure:

mica+$TiO_2$+$SiO_2$+$TiO_2$ mica+$TiO_2$+$SiO_2$+$TiO_2$/$Fe_2O_3$ mica+$TiO_2$+$SiO_2$+(Sn, Sb)$O_2$ $SiO_2$flake+$TiO_2$+$SiO_2$+$TiO_2$ Particularly preferred laser light-absorbent substances are anthracene, perylenes/rylenes, for example ter- and quaterrylenetetracarboxydiimides, pentaerythritol, copper hydroxide phosphates, molybdenum disulfide, antimony(III) oxide, bismuth oxychloride, carbon, carbon black, antimony, Sn(Sb) $O_2$, $TiO_2$, silicates, $SiO_2$ flakes, metal oxide-coated mica and/or $SiO_2$ flakes, conductive pigments, sulfides, phosphates, BiOCl, or mixtures thereof.

The energy absorber can also be a mixture of two or more components. In accordance with the invention, it is applied to the support (1) as a layer (2) (FIGS. 1, 2, 5, 8) or incorporated into the support layer (FIGS. 3, 4, 6, 9), in proportions of 2-50% by weight.

If these energy absorbers are already used as additives or for colouring the plastic, an inscription without energy absorbers in the inscription tape can be carried out under corresponding conditions according to FIGS. 5, 6 and 9.

The inscription medium (5) can be applied as a paste or as a layer with support. The inscription medium essentially consists of colorant, binder and optionally polymer component, preferably in dissolved form or in the form of particles and additives.

Both organic and inorganic colorants are suitable for the inscription. Suitable colorants are all those known to the person skilled in the art which do not decompose during the laser irradiation. The colorant can also be a mixture of two or more substances. The proportion of colorants in the inscription medium is preferably 0.1-30% by weight, in particular 0.2-20% by weight and very particularly preferably 0.5-10% by weight, based on the total weight of the inscription medium (colorant+binder+solvent+optionally polymer component).

Suitable colorants are all organic and inorganic dyes and pigments known to the person skilled in the art. Particularly suitable are azo pigments and dyes, such as, for example, mono- and diazo pigments and dyes, polycyclic pigments and dyes, such as, for example, perinones, perylenes, anthraquinones, flavanthrones, isoindolinones, pyranthrones, anthrapyrimidines, quinacridones, thioindigo, dioxazines, indanthronones, diketopyrrolo-pyrroles, quinophthalones, metal-complexing pigments and dyes, such as, for example, phthalocyanines, azo, azomethine, dioxime and isoindolinone complexes, metal pigments, oxide and oxide hydroxide pigments, oxide mixed-phase pigments, metal-salt pigments, such as, for example, chromate and chromate-molybdate mixed-phase pigments, carbonate pigments, sulfide and sulfide-selenium pigments, complex-salt pigments and silicate pigments.

Of the said colorants, particular preference is given to copper phthalocyanines, dioxazines, anthraquinones, monoazo and diazo pigments, diketopyrrolopyrrole, polycyclic pigments, anthrapyrimidines, quinacridones, quinophthalones, perinones, perylene, acridines, azo dyes, phthalocyanines, xanthenes, phenazines, coloured oxide and oxide hydroxide pigments, oxide mixed-phase pigments, sulfide and sulfide-selenium pigments, carbonate pigments, chromate and chromate-molybdate mixed-phase pigments, complex-salt pigments and silicate pigments.

The colorant/absorber ratio for the 2-step process (FIG. 10) is preferably 10:1-1:10, in particular 5:1-1:5, very particularly preferably 4:1-1:4.

In order to improve the adhesion, a polymer component can be added to the inscription medium. It preferably consists of low-melting polymers, such as, for example, polyesters, polycarbonates, polyolefins; polystyrene, polyvinyl chloride, polyimides, polyamides, polyacetals and copolymers of the said polymers, and terpolymers of vinyl chloride, dicarboxylates and vinyl acetate or hydroxy or methyl acrylate, or mixtures thereof. The polymer component may be dissolved in the inscription medium or in undissolved form as a fine powder. The particle sizes are preferably 10 nm-100 μm, in particular 100 nm-50 μm and very particularly preferably 500 nm-5 μm. It is also possible to employ a mixture of different polymer particles, where both the particle sizes and the chemical composition can differ.

The inscription medium preferably comprises 10-50% by weight, in particular 15-40% by weight and very particularly preferably 20-35% by weight, of polymers, based on the total weight of the colour paste comprising colorant+binder+solvent+polymer component.

The polymer component/colorant ratio is preferably 200:1-1:1, in particular 100:1-2:1, very particularly preferably 70:1-3:1.

As further component, the inscription medium comprises a binder. The binder enables homogeneous application of the inscription layer to materials such as, for example, glass or plastics, which are ideally in the form of films, tapes or sheets.

All binders known to the person skilled in the art are suitable, in particular cellulose, cellulose derivatives, such as, for example, cellulose nitrate, cellulose acetate, hydrolysed/acetalated polyvinyl alcohols, polyvinylpyrrolidones, polyolefins, for example polypropylenes and derivatives thereof, polyacrylates, and also copolymers of ethylene/ethylene acrylate, polyvinylbutyrals, epoxy resins, polyesters, polyisobutylene and polyamides.

Any additives added facilitate close contact of the inscription medium (5) with the plastic during inscription and produce a strong bond between inscription medium (5) and sealing (4). The additives preferably consist of polymers and copolymers of polyvinyl acetates, methyl, ethyl and butyl methacrylates, unsaturated polyester resins, or mixtures thereof.

The separation layer (3) is preferably formed from ester wax or polyvinyl alcohol. The separation layer must release the sealing layer easily and completely (without damage) from the tape on warming.

The sealing layer (4) can consist of polymers, preferably having glass transition temperatures of $\geqq 90°$ C., in particular of polymers of styrene, of methyl methacrylate or hydroxy-functional acrylates, PE waxes and dispersions, polyvinyl fluoride and nitrocellulose as binder.

The layer thicknesses of the multilayered systems are preferably:

Support layer (1, 7): 5-250 μm, preferably 15-75 μm

Energy absorber layer (2): 0.5-150 μm, preferably 1.0-120 μm

Separation layer (3): 0.1-1 μm, preferably 0.2-0.9 μm

Sealing layer (4): 1-10 μm, preferably 4-9 μm

Inscription layer (5, 6): 1-150 μm, preferably 15-100 μm

Layer (8) comprising inscription medium and energy absorber: 10-150 μm, preferably 15-100 μm The layer thicknesses of the multilayered systems should not exceed a total thickness of 10-350 μm, preferably 10-250 μm and in particular of 12-100 μm, since sharp-edged marking and complete sealing of the marking is not ensured in the case of excessively thick layer systems.

The multilayered systems described are laid on the plastic and brought into close contact with the areas to be inscribed by means of the requisite contact pressure, for example mechanically, by means of vacuum or through heat-activatable additives optionally added. The inscription is carried out using a suitable laser by the beam deflection method or mask method.

Depending on the type of plastic, all lasers known to the person skilled in the art can be employed for the inscription. The laser parameters are dependent on the particular application and can easily be determined by the person skilled in the art.

The inscription with the laser is carried out by introducing the test specimen into the ray path of a laser, preferably an Nd:YAG or Nd:$YVO_4$ laser. Furthermore, inscription with an excimer laser, for example via a mask method, is possible. However, the desired results can also be achieved using other conventional types of laser which have a wavelength in the region of high absorption of the laser light-absorbent substance used. The marking obtained is determined by the irradiation time (or number of pulses in the case of pulsed lasers) and irradiation power of the laser and the plastic system used. The power of the lasers used depends on the particular application and can readily be determined in each individual case by the person skilled in the art.

The laser used generally has a wavelength in the range from 157 nm to 10.6 μm, preferably in the range from 532 nm to 10.6 μm. Mention may be made here by way of example of $CO_2$ lasers (10.6 μm) and Nd:YAG lasers (1064 and 532 nm respectively) or pulsed UV lasers. The excimer lasers have the following wavelengths: $F_2$ excimer laser (157 nm), ArF excimer laser (193 nm), KrCl excimer laser (222 nm), KrF excimer laser (248 nm), XeCl excimer laser (308 nm), XeF excimer laser (351 nm), frequency-multiplied Nd:YAG lasers having wavelengths of 355 nm (frequency-tripled) or 265 nm (frequency-quadrupled). Particular preference is given to the use of Nd:YAG lasers (1064 and 532 nm respectively) and $CO_2$ lasers. The energy densities of the lasers employed are generally in the range from 0.3 mJ/cm$^2$ to 50 J/cm$^2$, preferably from 0.3 mJ/cm$^2$ to 10 J/cm$^2$.

The inscription is preferably carried out using an Nd:YAG laser, Nd:$VO_4$ laser or $CO_2$ laser in various laser wavelengths, 1064 nm, 532 nm or 808-980 nm. The labelling is possible both in cw (continuous wave) mode and in pulsed mode. The suitable power spectrum of the inscription laser extends from 2 to 100 watts, and the pulse frequency is preferably in the range from 1 to 100 Hz.

Corresponding lasers which can be employed in the process according to the invention are commercially available.

The plastic inscriptions according to the invention can be used in all cases where plastics have hitherto been inscribed by printing, embossing or engraving processes or in all cases where no colour-fast and permanent inscription/marking or no inscription/marking at all or only inscription/marking using laser-sensitive pigments in the plastic itself was hitherto possible. This relates to linear plastics or those crosslinked in a thermolabile manner, for example polyolefins, vinyl polymers, polyamides, polyesters, polyacetals, polycarbonates, in some cases also polyurethanes and ionomers.

The advantages of the inscription type according to the invention are colour fastness, permanence and flexibility/individuality, i.e. the labelling can be carried out without a mask, klischee or stamp specification.

It is possible for plastics of any type and shape, for example
- in the packaging industry (batch number, use-by dates, production data, notes)
- in the security sector (forgery-proof coding and labelling)
- in the motor vehicle and aircraft industries (cables, plugs, switches, containers, functional parts, hoses, lids, handles, levers, etc.)
- in medical technology (equipment, instruments, implants)
- in agriculture (animal ear marking)
- in electrical engineering/electronics (cables, plugs, switches, functional parts, type plates, rating plates)
- in the decorative sector (logos, model designation for equipment of all types, containers, toys, tools, individual markings), to be marked and/or inscribed.

The invention also relates to plastics which have been marked or inscribed in colour by the process according to the invention and whose marking has been sealed.

The following examples are intended to explain the invention, but without limiting it. The percentage data indicated are per cent by weight.

WORKING EXAMPLES

The individual layer systems are applied to the polyester support film or the preceding layer using a doctor blade or an engraved roll by gravure printing or by screen printing, depending on the layer thickness, and dried.

Example 1

Production of an Energy Absorber Layer (2)

| | |
|---|---|
| 18.5 g | of ethyl acetate |
| 1.5 g | of nitrocellulose |
| 2.0 g | of $Sn(Sb)O_2$ ($d_{50}$ value < 1.1 μm) (Du Pont) |

Nitrocellulose is dissolved in the initially introduced solvent ethyl acetate and stirred well (Ultraturrax, 2000 rpm). The energy absorber Sb-doped $SnO_2$ is subsequently stirred in, and a homogeneous paste is produced. The amount of energy absorber is dependent on the energy absorption of the colorant and on the plastic to be labelled and should be set in accordance therewith.

Example 2

Production of an Energy Absorber Layer (2)

| | |
|---|---|
| 18.5 g | of ethyl acetate |
| 1.5 g | of nitrocellulose |
| 2.0 g | of gas black (Special Black 6 from Degussa) ($d_{50}$ value < 17 nm) |

The processing is carried out analogously to Example 1. The absorber employed is gas black.

Example 3

Production of an Energy Absorber Layer (7)

For support films (7) with energy absorber already incorporated, preferably polyethylene, polypropylene, PET flat films or composites thereof comprising an effective energy absorber content, for example a carbon black content of 1-10%, are extruded or blown.

Example 4

Production of a Separation Layer (3)

| | |
|---|---|
| 19.9 g | of toluene |
| 0.1 g | of ester wax |

The PE wax is dissolved in toluene and stirred well.

Example 5

Production of a Sealing Layer (4)

| | |
|---|---|
| 8.0 g | of methyl ethyl ketone |
| 4.6 g | of toluene |
| 2.0 g | of cyclohexanone |
| 3.9 g | of PMMA ($T_g$: 122° C.) (Degussa) |
| 1.5 g | of PE wax |

The PE wax and PMMA are dissolved in the solvent mixture and homogenised using a dissolver.

Example 6

Production of a Sealing Layer (4)

| | |
|---|---|
| 8.0 g | of xylene |
| 4.0 g | of polystyrene |
| 2.0 g | of PE wax |

The PE wax and polystyrene are dissolved in xylene and homogenised using a dissolver.

Example 7

Production of a Sealing Layer (4)

| | |
|---|---|
| 40.0 g | of n-butyl acetate |
| 10.0 g | of polystyrene |
| 0.5 g | of ethylcellulose |
| 0.5 g | of UV stabiliser |

Ethylcellulose, polystyrene and UV stabiliser are dissolved in n-butyl acetate and homogenised using a dissolver.

Example 8

Preparation of a Polymer-Containing Inscription Medium (5)

| | |
|---|---|
| 20.0 g | of ethyl acetate |
| 2.0 g | of nitrocellulose |
| 6.0 g | of polypropylene powder ($d_{50}$ < 50 mm) (for example Coathylene PB 0580, Du Pont) |
| 2.0 g | of Cu phthalocyanine |
| 1.0 g | of UV stabiliser (benzotriazole derivative) |

The nitrocellulose is dissolved in the initially introduced solvent ethyl acetate and stirred well. The polypropylene powder, the colorant copper phthalocyanine and the UV stabiliser are subsequently stirred in, and a homogeneous paste is produced. If necessary, a three-roll mill is employed in order to improve the paste homogeneity.

The paste is coated onto polyester films using, for example, a doctor blade and dried.

Example 9

Preparation of a Polymer-Containing Inscription Medium (5)

| | |
|---|---|
| 25.0 g | of methyl ethyl ketone |
| 34.0 g | of toluene |
| 12.0 g | of PVC-PVAc copolymer |
| 16.0 g | of polyurethane |
| 0.5 g | of titanium oxide |

The processing is carried out analogously to Example 8. The colorant employed is titanium dioxide.

Example 10

Preparation of a Polymer-Containing Inscription Medium (5)

| | | |
|---|---|---|
| 35.0 | g | of n-butyl acetate |
| 6.0 | g | of polystyrene |
| 2.0 | g | of nitrocellulose |
| 2.0 | g | of Cu phthalocyanine |

The processing is carried out analogously to Example 8. The colorant employed is Cu phthalocyanine.

Example 11

Production of a Layer (8) from Inscription Medium (5) and Energy Absorber (2)

| | | |
|---|---|---|
| 20.0 | g | of ethyl acetate |
| 2.0 | g | of nitrocellulose |
| 6.0 | g | of Irgazin Red |
| 1.2 | g | of $Sn(Sb)O_2$ |

The processing is carried out analogously to Example 7. The colorant employed is Irgazin Red and the absorber employed is $Sn(Sb)O_2$.

The invention claimed is:

1. A process for the permanent and abrasion-resistant colored inscription and/or marking of plastics, comprising expressing to laser light a layer system which consists of at least three superjacent layers, where the first layer is a support film which is transparent to laser light, to which a laser light-sensitive energy absorber layer is applied or into which an energy absorber is incorporated, subsequently a separation layer and a sealing layer, and, as a final layer, an inscription medium comprising colorant and optionally polymer component or an inscription medium already comprising a sealing polymer, wherein the inscription medium is introduced into the plastic surface under the action of laser light during the inscription/marking, and wherein bleeding-out or efflorescence of the colorants and/or absorbers in the plastic is prevented by sealing laser-inscribed areas with a transparent polymer during the inscription process or immediately thereafter.

2. The process for the permanent and abrasion-resistant colored inscription and/or marking of plastics according to claim 1, wherein the polymer has a glass transition temperature of $\geqq 90°$ C.

3. The process for the permanent and abrasion-resistant colored inscription and/or marking of plastics according to claim 1, wherein the sealing layer consists of polymers of styrene, of vinyl chloride, of methyl methacrylate or hydroxy-functional acrylates or of polyvinyl fluoride.

4. The process for the permanent and abrasion-resistant colored inscription and/or marking of plastics according to claim 1, wherein the polymer layer has thicknesses of 1-10 μm.

5. The process for the permanent and abrasion-resistant colored inscription and/or marking of plastics according to claim 1, wherein marking is carried out by an indirect inscription process.

6. The process for the permanent and abrasion-resistant colored inscription and/or marking of plastics according to claim 1, wherein inscription is carried out using a laser and the sealing is carried out in one step.

7. The process for the permanent and abrasion-resistant colored inscription and/or marking of plastics according to claim 1, wherein, in a 2-step process, firstly inscription is carried out using a laser and immediately subsequently, in a second step, sealing of inscribed areas is carried out.

8. Plastics which have a sealed marking and/or inscription by the process according to claim 1.

9. A process for the permanent and abrasion-resistant colored inscription and/or marking of plastics, comprising first exposing to laser light a layer system consisting of a support film which is transparent to laser light and an energy absorber layer and an inscription medium as separate layers or a layer system consisting of support film and a layer consisting of a mixture of inscription medium and energy absorber or a layer system consisting of a support film into which the energy absorber is incorporated and the inscription medium, and the layer system is marked using a laser, during which the inscription medium is transferred to softened plastic, and, second, the sealing is carried out using a layer system consisting of a support layer which is transparent to laser light, a laser-sensitive absorber layer or a support film into which the energy absorber is incorporated, a separation layer and a sealing layer and irradiated using a laser, during which the requisite energy is transferred via the energy absorber layer to the separation layer, which softens and thus transfers the sealing layer to the plastic, and bleeding-out or efflorescence of the colorants and/or absorbers in the plastic is prevented by sealing laser-inscribed areas with a transparent polymer during the inscription process or immediately thereafter.

10. A process for the permanent and abrasion-resistant colored inscription and/or marking of plastics, comprising exposing to laser light a layer system which consists of at least three superjacent layers, where the first layer is a self-absorbent support film which is transparent to laser light, to which a separation layer and a sealing layer and, as a final layer, an inscription medium comprising colorant and optionally polymer component or an inscription medium already comprising a sealing polymer are subsequently applied, with the inscription medium being incorporated into the plastic surface, to the inscribed under the action of laser light during the inscription/marking, and bleeding-out or efflorescence of the colorants and/or absorbers in the plastic is prevented by sealing laser-inscribed areas with a transparent polymer during the inscription process or immediately thereafter.

11. A process for the permanent and abrasion-resistant colored inscription and/or marking of plastics, comprising first expressing to laser light a layer system consisting of a self-absorbent support film which is transparent to laser light and a layer consisting of a mixture of inscription medium and energy absorber or a layer system consisting of a support film into which an energy absorber is incorporated and an inscription medium, and the layer system is marked using a laser, during which the inscription medium is transferred to the softened plastic and, second, the sealing is carried out using a layer system consisting of a support layer which is transparent to laser light, a laser-sensitive absorber layer or a support film into which the energy absorber is incorporated, a separation layer and a sealing layer and irradiated using a laser, during which the requisite energy is transferred via the energy absorber layer to the separation layer, which softens and thus transfers the sealing layer to the plastic, and bleeding-out or efflorescence of the colorants and/or absorbers in the plastic is prevented by sealing laser-inscribed areas with a transparent polymer during the inscription process or immediately thereafter.

12. Plastics which have a sealed marking and/or inscription by the process according to claim 9.

13. Plastics which have a sealed marking and/or inscription by the process according to claim 10.

14. Plastics which have a sealed marking and/or inscription by the process according to claim 11.

* * * * *